(12) United States Patent
Kolter et al.

(10) Patent No.: US 8,524,827 B2
(45) Date of Patent: Sep. 3, 2013

(54) METHOD FOR THE STABILIZATION OF POLYVINYLPYRROLIDONES

(75) Inventors: Karl Kolter, Limburgerhof (DE); Ivette Garcia Castro, Ludwigshafen Gartenstadt (DE); Olga Pinneker, Hessheim (DE); Ralf Widmaier, Mannheim (DE); Karl-Hermann Strube, Speyer (DE); Bernhard Fussnegger, Kirrweiler (DE); Manfred Kroll, Ludwigshafen (DE); Frank Höfer, Bad Dürkheim (DE); Hermann Ascherl, Dirmstein (DE); Peter Schmidt, Weisenheim (DE)

(73) Assignee: BASF SE (DE)

( * ) Notice: Subject to any disclaimer, the term of this patent is extended or adjusted under 35 U.S.C. 154(b) by 1141 days.

(21) Appl. No.: 11/815,478

(22) PCT Filed: Feb. 8, 2006

(86) PCT No.: PCT/EP2006/050737
§ 371 (c)(1),
(2), (4) Date: Aug. 3, 2007

(87) PCT Pub. No.: WO2006/084851
PCT Pub. Date: Aug. 17, 2006

(65) Prior Publication Data
US 2008/0139724 A1    Jun. 12, 2008

(30) Foreign Application Priority Data
Feb. 9, 2005 (DE) .................. 10 2005 005 974

(51) Int. Cl.
*C08L 39/06* (2006.01)
*C08K 3/30* (2006.01)
*C08K 13/02* (2006.01)
*C08K 5/09* (2006.01)

(52) U.S. Cl.
USPC ............ 524/555; 524/420; 524/290; 524/381

(58) Field of Classification Search
USPC .................... 524/555, 420, 290, 381
See application file for complete search history.

(56) References Cited

U.S. PATENT DOCUMENTS

| | | | | |
|---|---|---|---|---|
| 2,872,433 | A * | 2/1959 | Glickman | 524/418 |
| 6,331,333 | B1 | 12/2001 | Wu et al. | |
| 6,498,231 | B2 * | 12/2002 | Tomihisa et al. | 528/501 |
| 6,592,900 | B1 | 7/2003 | Buhler et al. | |
| 7,495,055 | B2 * | 2/2009 | Soerens et al. | 524/588 |

FOREIGN PATENT DOCUMENTS

| | | |
|---|---|---|
| EP | 873130 | 10/1998 |
| EP | 1083884 | 3/2001 |
| GB | 836831 | 6/1960 |
| WO | 9618673 | 6/1996 |

* cited by examiner

*Primary Examiner* — Satya Sastri
(74) *Attorney, Agent, or Firm* — Novak Druce Connolly Bove + Quigg LLP

(57) ABSTRACT

Method for stabilizing polyvinylpyrrolidones, which comprises treating the polyvinylpyrrolidones with sulfur dioxide, sulfurous acid or alkali metal sulfites and then with free-radical scavenger, and converting the solutions treated in this way into the powdered polyvinylpyrrolidones by drying.

21 Claims, No Drawings

METHOD FOR THE STABILIZATION OF POLYVINYLPYRROLIDONES

CROSS REFERENCE TO RELATED APPLICATIONS

This application is a National Phase of International Application No. PCT/EP2006/050737 filed on Feb. 8, 2006, which claims priority to Application No. 102005005974.0 filed in Germany on Feb. 9, 2005 under 35 U.S.C. §119 ; the entire contents of all are hereby incorporated by reference.

The present invention relates to a method for preparing polyvinylpyrrolidones stabilized against peroxide formation.

Polyvinylpyrrolidones such as homo- and copolymers of N-vinylpyrrolidone are normally converted after their polymerization into free-flowing powders by spray drying or drum drying or another hot-air drying. During these processes there is, owing to the intensive contact with air and the heat, formation of traces of peroxides, and the content thereof increases further during the subsequent packaging and storage. This tendency to form peroxides can give rise to problems on use of polyvinylpyrrolidones in pharmaceutical preparations. Current pharmacopoeias, e.g. Ph. Eur. 3 and JP XIII, limit the peroxide content in these polymers to a maximum of 400 ppm. The kinetics of peroxide formation can be slowed down, although not prevented, by drying with exclusion of air, storage at low temperatures or hermetically sealed packaging under vacuum or an inert gas. The peroxide content can also initially be reduced by treatment at elevated temperatures and/or slightly alkaline pH. This reduction is however only of a short-term nature; the peroxide content quickly increases again afterward. In addition, these methods are associated with very great expenditure, so that acceptance by users is low.

EP-B 873 130 recommends for preventing peroxide formation that polyvinylpyrrolidones are spray dried under a nitrogen atmosphere and stored in air-tight containers.

The use of antioxidants such as, for example, phenolic antioxidants, ascorbic acid, ethoxyquin, butylated hydroxytoluene, tocopherol or nordihydroguaraietic acid for preventing unwanted oxidative processes is generally known. It is likewise known that phenolic antioxidants are of only limited suitability because of their deficient biodegradability (cf. Römpp-Chemie-Lexikon, 9th edition, Georg Thieme Verlag, Stuttgart, 1992).

U.S. Pat. No. 6,331,333 discloses that polyvinylpyrrolidones are stored to prevent peroxide formation during storage in oxygen-impermeable packages in the presence of an oxygen scavenger. Ascorbic acid, iron powder or iron salts are used as oxygen scavengers. Oxygen scavengers and polyvinylpyrrolidone are spatially separated in this case.

U.S. Pat. No. 6,498,231 discloses that, for stabilization during storage, polyvinylpyrrolidones are mixed with an antioxidant and stored under an atmosphere which comprises not more than 50,000 ppm oxygen. The antioxidants employed are, for example, phenolic or bisphenolic compounds, preferably thioamide or thiourea derivatives. Such antioxidants are, however, not entirely physiologically innocuous, which may be a problem on use of the polymers in pharmaceutical preparations.

GB 836,831 discloses a method for stabilizing polyvinylpyrrolidones against discoloration, in which solutions of the polymers are treated with sulfur dioxide, sulfurous acid or alkali metal sulfites. However, it has emerged that with this method the buildup of peroxides after storage in fact occurs to a greater extent than with untreated polymers.

EP-B 1083 884 describes a method for stabilizing polyvinylpyrrolidones against peroxide formation, in which aqueous solutions of the polymers are mixed with very small amounts of heavy metals or with enzymes which cleave peroxides. However, the use of heavy metals is disadvantageous because of the possible accumulation of the heavy metals in the body. The use of enzymes is disadvantageous in particular for reasons of stability and cost.

It was an object of the present invention to find an improved method for stabilizing polyvinylpyrrolidones against peroxide formation, which method helps to avoid the disadvantages described.

Accordingly, a method for preparing polyvinylpyrrolidones stabilized against peroxide formation has been found and comprises treating the polyvinylpyrrolidones initially with sulfur dioxide, sulfurous acid or the alkali metal salts thereof and subsequently with a free-radical scavenger.

Polyvinylpyrrolidones are according to the invention the homo- and copolymers of N-vinylpyrrolidone, especially the water-soluble polyvinylpyrrolidones. The method is likewise also suitable for crosslinked, water-insoluble polyvinylpyrrolidone (Crospovidone).

Suitable copolymers preferably have a vinylpyrrolidone content of at least 20% by weight. Suitable comonomers are all monomers capable of free-radical copolymerization with N-vinylpyrrolidone.

The number of comonomers in a polymer is not limited per se. However, it is normally less than 5.

Examples of suitable monomers are N,N-dimethylaminomethyl(meth)acrylate, N,N-diethylaminomethyl (meth)acrylate, N,N-dimethylaminoethyl(meth)acrylate, N,N-diethylaminoethyl (meth)acrylate, N-[3-(dimethylamino)propyl]methacrylamide and N-[3-(dimethylamino)propyl]acrylamide.

Monomers which can likewise be used are substituted acrylic acids and salts, esters and amides thereof, where the substituents are located on the carbon atoms in the two or three position of acrylic acid, and are selected independently of one another from the group consisting of $C_1$-$C_4$ alkyl, —CN, COOH, particularly preferably methacrylic acid, ethacrylic acid and 3-cyanoacrylic acid. These salts, esters and amides of these substituted acrylic acids may be selected as described above for the salts, esters and amides of acrylic acid.

Other suitable monomers are alkyl esters of $C_1$-$C_{40}$ linear, $C_3$-$C_{40}$ branched-chain or $C_3$-$C_{40}$ carbocyclic carboxylic acids, vinyl halides or allyl halides, preferably vinyl chloride and allyl chloride, vinyl ethers, preferably methyl, ethyl, butyl or dodecyl vinyl ether, vinylformamide, vinylmethylacetamide, vinylamine; vinyllactams, preferably vinylpyrrolidone and vinylcaprolactam, vinyl- or allyl-substituted heterocyclic compounds, preferably vinylpyridine, vinyloxazoline and allylpyridine.

Also suitable are N-vinylimidazoles in which $R^9$ to $R^{11}$ is independently of one another hydrogen, $C_1$-$C_4$-alkyl or phenyl:

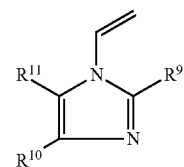

(III)

Further suitable monomers are diallylamines of the general formula

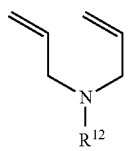

with
$R^{12} = C_1$— to $C_{24}$-alkyl.

Further suitable monomers are vinylidene chloride; and hydrocarbons having at least one carbon-carbon double bond, preferably styrene, alpha-methylstyrene, tert-butylstyrene, butadiene, isoprene, cyclohexadiene, ethylene, propylene, 1-butene, 2-butene, isobutylene, vinyltoluene, and mixtures of these monomers.

Particularly suitable monomers are acrylic acid, methacrylic acid, ethylacrylic acid, methyl acrylate, ethyl acrylate, propyl acrylate, n-butyl acrylate, iso-butyl acrylate, t-butyl acrylate, 2-ethylhexyl acrylate, decyl acrylate, methyl methacrylate, ethyl methacrylate, propyl methacrylate, n-butyl methacrylate, iso-butyl methacrylate, t-butyl methacrylate, 2-ethylhexyl methacrylate, decyl methacrylate, methyl ethacrylate, ethyl ethacrylate, n-butyl ethacrylate, iso-butyl ethacrylate, t-butyl ethacrylate, 2-ethylhexyl ethacrylate, decyl ethacrylate, stearyl(meth)acrylate, 2,3-dihydroxypropyl acrylate, 2,3-dihydroxypropyl methacrylate, 2-hydroxyethyl acrylate, hydroxypropyl acrylates, 2-hydroxyethyl methacrylate, 2-hydroxyethyl ethacrylate, 2-methoxyethyl acrylate, 2-methoxyethyl methacrylate, 2-methoxyethyl ethacrylate, 2-ethoxyethyl methacrylate, 2-ethoxyethyl ethacrylate, hydroxypropyl methacrylates, glyceryl monoacrylate, glyceryl monomethacrylate, polyalkylene glycol (meth)acrylates, unsaturated sulfonic acids such as, for example, acrylamidopropanesulfonic acid;

acrylamide, methacrylamide, ethacrylamide, N-methylacrylamide, N,N-dimethylacrylamide, N-ethylacrylamide, N-isopropylacrylamide, N-butylacrylamide, N-t-butylacrylamide, N-octylacrylamide, N-t-octylacrylamide, N-octadecylacrylamide, N-phenylacrylamide, N-methylmethacrylamide, N-ethylmethacrylamide, N-isopropylmethacrylamide, N-dodecylmethacrylamide, 1-vinylimidazole, 1-vinyl-2-methylvinylimidazole, N,N-dimethylaminomethyl(meth)acrylate, N,N-diethylaminomethyl (meth)acrylate, N,N-dimethylaminoethyl(meth)acrylate, N,N-diethylaminoethyl (meth)acrylate, N,N-dimethylaminobutyl(meth)acrylate, N,N-diethylaminobutyl (meth)acrylate, N,N-dimethylaminohexyl (meth)acrylate, N,N-dimethylaminooctyl (meth)acrylate, N,N-dimethylaminododecyl(meth)acrylate, N-[3-(dimethylamino)propyl]methacrylamide, N-[3-(dimethylamino)propyl]acrylamide, N-[3-(dimethylamino)butyl]methacrylamide, N-[8-(dimethylamino)octyl]methacrylamide, N-[1,2-(dimethylamino)dodecyl]methacrylamide, N-[3-(diethylamino)propyl]-methacrylamide, N-[3-(diethylamino)propyl]acrylamide;

N-isopropylmethacrylamide is particularly preferred.

Maleic acid, fumaric acid, maleic anhydride and its hemiesters, crotonic acid, itaconic acid, diallyidimethylammonium chloride, vinyl ethers (for example: methyl, ethyl, butyl or dodecyl vinyl ether), vinylformamide, N-vinyl-N-methylacetamide, vinylamine; methyl vinyl ketone, maleimide, vinylpyridine, vinylimidazole, vinylfuran, styrene, styrenesulfonate, allyl alcohol, and mixtures thereof. N-Vinyl-N-methylacetamide is particularly preferred.

Of these, particular preference is given to acrylic acid, methacrylic acid, maleic acid, fumaric acid, crotonic acid, maleic anhydride and its hemiesters, methyl acrylate, methyl methacrylate, ethyl acrylate, ethyl methacrylate, n-butyl acrylate, n-butyl methacrylate, t-butyl acrylate, t-butyl methacrylate, isobutyl acrylate, isobutyl methacrylate, 2-ethylhexyl acrylate, stearyl acrylate, stearyl methacrylate, N-t-butylacrylamide, N-octylacrylamide, 2-hydroxyethyl acrylate, hydroxypropyl acrylates, 2-hydroxyethyl methacrylate, hydroxypropyl methacrylates, alkylene glycol (meth)acrylates, styrene, unsaturated sulfonic acids such as, for example, acrylamidopropanesulfonic acid, vinylpyrrolidone, vinylcaprolactam, vinyl ethers (e.g.: methyl, ethyl, butyl or dodecyl vinyl ether), vinylformamide, N-vinyl-N-methylacetamide, vinylamine, 1-vinylimidazole, 1-vinyl-2-methylimidazole, N,N-dimethylaminomethyl methacrylate and N-[3-(dimethylamino)propyl]methacrylamide; 3-methyl-1-vinylimidazolium chloride, 3-methyl-1-vinylimidazolium methyl sulfate, N,N-dimethylaminoethyl methacrylate, N-isopropylmethacrylamide, N-[3-(dimethylamino)-propyl]methacrylamide quaternized with methyl chloride.

VCAp, VI, 1-vinyl-3-methylimidazolium chloride (QVI), VAC, (meth)acrylamide, dimethylaminoethyl(meth)acrylate and dimethylaminoethyl(meth)acrylamide and their quaternized analogs, diallyldimethylammonium chloride, vinyl alcohol (by hydrolysis from vinyl acetate after polymerization), VFA, vinylamine (by hydrolysis from VFA after polymerization), dimethylaminopropyl(meth)acrylate, dimethylaminopropyl(meth)-acrylamide, (meth)acrylic acid, vinylpiperidone, N,N-dimethyl(meth)acrylamide, tert-butyl (meth)acrylamide, N-tert-octyl(meth)acrylamide, stearyl (meth)acrylamide, methyl, ethyl, butyl, tert-butyl(meth)acrylate, 2,3-dihydroxypropyl(meth)acrylate, N-isopropylacrylamide, vinyl propionate, 1-vinyl-2-methylimidazole, styrene, vinylpyridine, esters of (meth)acrylic acid or ethers of allyl alcohol and of polyethylene oxide or propylene oxide or poly(ethylene oxide-co-propylene oxide) having a total of 2 to 200 EO or PO units or EO/PO units with methoxy group or hydroxy group at the chain end, maleic acid, fumaric acid, methyl vinyl ether, hydroxyethyl(meth) acrylate, hydroxypropyl(meth)acrylate, vinyllactams, vinyloxazolines such as vinyloxazoline, vinylmethyloxazoline, vinylethyloxazoline, acrylamidopropanesulfonic acid, allyl alcohol.

Very particularly preferred comonomers are N-vinyllactams such as N-vinylcaprolactam (VCAp), N-vinylformamide, also N-vinylimidazole (VI), 1-vinyl-3-methylimidazolium chloride (QVI), vinyl esters of aliphatic carboxylic acids such as vinyl acetate, vinyl propionate, vinyl butyrate, vinyl laurate, vinyl stearate, also (meth)acrylamide, dimethylaminoethyl(meth)acrylate and dimethylaminoethyl(meth)acrylamide and their quaternized analogs, diallyidimethylammonium chloride.

Accordingly, very particularly preferred copolymers are copolymers of N-vinylpyrrolidone (VP) with vinyl acetate having a VP/VAc ratio by weight of from 20:80 to 80:20, for example 30:70, 50:50, 60:40, 70:30, having K values of from 10 to 100, preferably 20 to 50, also copolymers of VP and VI, for example having a VP/VI ratio by weight of 1:1; copolymers of VP and VCap, for example having a ratio by weight of 1:1, having K values of from 10 to 100, preferably 20 to 60.

Further preferred copolymers are those of VP and 1-vinyl-3-methylimidazolium chloride (obtained by quaternization of 1-vinylimidazole with methyl chloride) having a VP/QVI ratio by weight of from 20:80 to 99:1, it being possible for the copolymers to have molecular weights of from 40,000 to >1,000,000 daltons.

In particular, aqueous solutions of NVP homopolymers having K values of from 1 to 150, preferably K10 to K90, for example K12, K15, K 17, K25, K30, K60, K85, K90, are also stabilized according to the invention.

The preparation of such polyvinylpyrrolidones by free-radical polymerization is known per se. The polymerization can also take place in the presence of conventional crosslinkers.

The polymerization can take place for example as solution polymerization in a suitable solvent such as water, mixtures of water and organic solvents, for example ethanol/water or isopropanol/water mixtures or in pure organic solvents such as ethanol or isopropanol.

A further possible polymerization method is popcorn polymerization, which leads to a crosslinked, water-insoluble polymer (Breitenbach et al. IUPAC International Symposium on macromolecular Chemistry, Budapest 1969 (pp. 529-544), Haff, Sanner, Straub, Polymer Journal Vol 17, No. 1 pp 143-152 (1985).

The polymer solutions to be treated normally have a solids content of from 5 to 60% by weight, preferably 10-50% by weight. It is possible to use solutions as obtained directly from the preparation of the polymers, or else to dissolve powdered polymers in water.

The treatment ordinarily takes place following the polymerization, preferably in the solvent of the polymerization reaction. Treatment of aqueous solutions is particularly preferred.

In the case of a polymerization in an organic solvent, it may also be advisable initially to replace the organic solvent at least partly or completely by water and then to carry out the treatment.

Where the polymers are insoluble or of low solubility in water, the treatment can also take place in the aqueous dispersion or suspension.

The polyvinylpyrrolidones are treated according to the invention by stirring in solution or dispersion with sulfur dioxide, sulfurous acid or alkali metal or alkaline earth metal sulfites. The alkali metal sulfite used is, for example, potassium sulfite, potassium bisulfite, lithium sulfite, lithium bisulfite or preferably sodium sulfite or sodium bisulfite. The sulfurous acid or the sulfites or bisulfites are used in amounts of from 0.005 to 1% by weight based on the amount of polyvinylpyrrolidones, preferably 0.01 to 0.5% by weight and particularly preferably 0.03 to 0.20%. The appropriate concentration of sulfurous acid can be obtained directly by passing an appropriate amount of sulfur dioxide into the aqueous polymer solution or the aqueous dispersion. On treatment of polymer solutions in organic solvents it is likewise possible to add the above-mentioned substances.

The preferred pH range for the treatment with the above-mentioned peroxide destroyers is 3-11, preferably 6-10, particularly preferably 7-9.

The polymers are additionally treated according to the invention with a free-radical scavenger. The free-radical scavenger can be employed in amounts of from 0.01 to 1% by weight based on the polymer, preferably 0.03 to 0.5% by weight, particularly preferably 0.05 to 0.25% by weight.

Suitable free-radical scavengers are: ascorbic acid, nordihydroguaiaretic acid, ethoxyquin, bisabolol, ascorbyl palmitate, BHT ("butylated hydroxytoluene": 2,6-di-tertiary-butyl-4-methylphenol).

Ascorbic acid is preferably employed as free-radical scavenger. It is also possible to use ammonium, alkali metal, alkaline earth metal salts of ascorbic acid such as, for example, ammonium ascorbate, sodium ascorbate or magnesium ascorbate. Also suitable are esters of ascorbic acid with inorganic or organic acids such as ascorbyl carbonate, ascorbyl phosphate, ascorbyl sulfate, ascorbyl stearate or ascorbyl palmitate, and the ammonium, alkali metal, alkaline earth metal salts thereof, for example sodium ascorbyl phosphate or sodium ascorbyl palmitate.

The method of the invention is carried out by adding sulfur dioxide or sulfurous acid or its salts at elevated temperatures to the polymerization solution following the polymerization. This treatment can take place at from 10 to 100° C., preferably at from 40 to 90° C. The duration of the treatment depends on the amount to be treated. The duration of treatment can be in the range from 1 min up to 4 hours, preferably 10 min to 1 hour.

The solution or dispersion is then treated with the ascorbic acid. This treatment takes place at temperatures of from 0 to 100° C., preferably 15 to 80° C., particularly preferably 20 to 60° C.

The treatment preferably takes place with stirring. The treatment is normally carried out under atmospheric pressure, but a gage pressure of up to 1.6 MPa may also be advisable.

The preferred pH range for this second treatment with the free-radical scavengers is 3-10, preferably 4-9.

The polymer solutions or dispersions treated in this way are then converted into free-flowing polymer powder by drying. The drying can take place for example by spray drying, drum drying or another hot-air drying. Spray drying and drum drying are preferred drying methods.

The powdered polymers are normally filled into suitable packaging materials directly after the drying. It is possible in principle to employ all packaging materials which are permissible for drug, food or cosmetic applications. Advantageous materials are, of course, those having little or no oxygen permeability. However, it has surprisingly emerged that an excellent stabilization can be achieved even if the packaging materials are oxygen-permeable, and the polyvinylpyrrolidone is present in an atmosphere having a high oxygen content. This shows to a particular degree the protective function of the stabilization of the invention.

It is, of course, also possible for the packaging to take place with introduction of nitrogen or inert gas.

The method of the invention surprisingly achieves a distinctly improved long-term stabilization against buildup of peroxides. In particular, the stability during thermal stress and the stability in oxygen-containing medium is distinctly improved.

It is also advantageous that this stabilization can be achieved without residues other than ascorbic acid, which has excellent physiological tolerability, occurring in the polymer powder owing to the treatment. Unexpectedly, no sulfurous acid or a salt thereof and, after a few months, no ascorbic acid either is present in the polymer powder but, nevertheless, the stabilization against peroxides is still strong.

The polyvinylpyrrolidones stabilized in this way are therefore particularly advantageously suitable for use in pharmaceutical or cosmetic preparations or for use in food and other consumables technology. Allergic reactions or other intolerances like those which may occur due to other antioxidants, heavy metals or enzymes are completely avoided.

EXAMPLES

The peroxide content was determined in all the samples by the iodometric method. The numerical data are based on the ppm values (mg of peroxide/kg of polymer) calculated as hydrogen peroxide.

Example 1

A 20% strength aqueous solution of polyvinylpyrrolidone having a K value of 30 (measured in a 1% by weight aqueous solution) was treated at 80° C. with 0.1% by weight of sulfur dioxide based on polymer (in the form of a 6% solution of $SO_2$ in water), and the solution was stirred for one hour. The solution was then cooled to 40° C. and 0.1% by weight of ascorbic acid, based on polymer, was added. The solution treated in this way was spray dried. The powdered polyvinylpyrrolidone was then sealed into sacks of aluminum composite sheet, the filled sack being flushed with nitrogen twice before the sealing and being stored under various conditions. In addition, samples were also sealed under air and then stored at 25° C. The peroxide content was determined directly after treatment and after storage for three and six months. The results are listed in Table 1 below.

Example 1a

A 20% strength aqueous solution of polyvinylpyrrolidone having a K value of 30 (measured in a 1% by weight aqueous solution) was treated at 80° C. with 0.2% by weight of $Na_2SO_3$ based on polymer, and the solution was stirred for one hour. The solution was then cooled to 40° C. and 0.1% by weight of ascorbic acid, based on polymer, was added. The solution treated in this way was spray dried. The powdered polyvinylpyrrolidone was then sealed into sacks of aluminum composite sheet, the filled sack being flushed with nitrogen twice before the sealing and being stored under various conditions. In addition, samples were also sealed under air and then stored at 25° C. The peroxide content was determined directly after treatment and after storage for three and six months. The results are listed in the table below.

TABLE 1

|  | Filling under air; storage at 25° C. | Filling under nitrogen; storage at 25° C./ 60% RH | Filling under nitrogen; storage at 40° C./ 75% RH |
|---|---|---|---|
| Example 1 |  |  |  |
| Zero value | <1 | <1 | <1 |
| 3 months | 51 | 9 | 17 |
| 6 months | 46 | 43 | 39 |
| Example 1a |  |  |  |
| Zero value | <1 | <1 | <1 |
| 3 months | <1 | <10 | <10 |
| 6 months | <1 | <20 | <20 |

Example 2

Comparative

The polymer solution was stirred at 80° C. for one hour after the polymerization without addition of a stabilizer and was then spray dried (untreated sample).

Example 3

Comparative

Treatment Only with Sulfur Dioxide

The polymer solution was treated with sulfur dioxide in analogy to Example 1 and then spray dried.

Example 4

Comparative

Treatment Only with Ascorbic Acid

The polymer solution was treated in analogy to Example 1 but without addition of sulfur dioxide.

Example 5

Treatment with Sulfur Dioxide and Other Further Free-Radical Scavengers

The polymer solution was treated in analogy to Example 1 but with addition of 0.1% by weight of other free-radical scavengers instead of ascorbic acid.
5a) Nordihydroguaiaretic acid
5b) Ethoxyquin
5c) Ascorbyl palmitate
5d) BHT
5e) Tocopherol
5f) Bisabolol The powders of Examples 2 to 5 were packaged in analogy to Example 1 and investigated for their peroxide content. The results are listed in Table 2 below.

TABLE 2

| Example No. | Packaging under air; storage at 25° C. | Packaging under nitrogen; storage at 25° C./60% RH | Packaging under nitrogen; storage at 40° C./75% RH |
|---|---|---|---|
| 2) |  |  |  |
| zero value | 57 | 37 | 37 |
| 3 months | 149 | 40 | 162 |
| 6 months | 346 | 184 | 406 |
| 3) |  |  |  |
| zero value | <1 | <1 | <1 |
| 3 months | 339 | 383 | 390 |
| 6 months | 458 | 459 | 354 |
| 4) |  |  |  |
| zero value | 95 | 95 | 95 |
| 3 months | 75 | 81 | 96 |
| 6 months | 86 | 85 | 105 |
| 5a) |  |  |  |
| zero value | <1 | <1 | <1 |
| 3 months | 104 | 6 | 57 |
| 6 months | 259 | 32 | 166 |
| 5b) |  |  |  |
| zero value | <1 | <1 | <1 |
| 3 months | 101 | 94 | 95 |
| 6 months | 256 | 95 | 210 |
| 5c) |  |  |  |
| zero value | <1 | <1 | <1 |
| 3 months | 150 | 120 | 186 |
| 6 months | 287 | 250 | 350 |

TABLE 2-continued

| Example No. storage | Packaging under air; storage at 25° C. | Packaging under nitrogen; storage at 25° C./60% RH | Packaging under nitrogen; storage at 40° C./75% RH |
|---|---|---|---|
| 5d) | | | |
| zero value | <1 | <1 | <1 |
| 3 months | 125 | 100 | 170 |
| 6 months | 189 | 140 | 237 |
| 5e) | | | |
| zero value | <1 | <1 | <1 |
| 3 months | 110 | 65 | 150 |
| 6 months | 192 | 159 | 235 |
| 5f) | | | |
| zero value | <1 | <1 | <1 |
| 3 months | 105 | 100 | 112 |
| 6 months | 264 | 131 | 188 |
| 6) | | | |
| zero value | <2 | <2 | <2 |
| 3 months | 3 | 5 | 7 |
| 6 months | 5 | 7 | 8 |
| 6a) | | | |
| zero value | 11 | 11 | 11 |
| 3 months | 20 | 15 | 30 |
| 6 months | 32 | 21 | 45 |
| 7) | | | |
| zero value | <2 | <2 | <2 |
| 3 months | 12 | 15 | 20 |
| 6 months | 20 | 21 | 30 |
| 7a) | | | |
| zero value | 39 | 39 | 39 |
| 3 months | 120 | 100 | 150 |
| 6 months | 300 | 280 | 360 |
| 8) | | | |
| zero value | <2 | 2 | <2 |
| 3 months | 25 | 23 | 25 |
| 6 months | 40 | 34 | 43 |
| 8a) | | | |
| zero value | 20 | 20 | 20 |
| 3 months | 130 | 35 | 150 |
| 6 months | 350 | 180 | 400 |
| 9) | | | |
| zero value | <2 | <2 | <2 |
| 3 months | 12 | 10 | 29 |
| 6 months | 20 | 18 | 51 |
| 9a) | | | |
| zero value | 32 | 32 | 32 |
| 3 months | 158 | 89 | 165 |
| 6 months | 385 | 199 | 476 |

Example 6

A 20% aqueous solution of a vinylpyrrolidone/vinyl acetate (6:4) copolymer with a K value of 27 (measured in a 1% by weight aqueous solution) was treated at 80° C. with 0.1% by weight of sulfur dioxide (based on polymer; employed in the form of a 6% solution of $SO_2$ in water), and the solution was stirred for one hour. The solution was then cooled to 40° C., and 0.1% by weight of ascorbic acid (based on polymer) was added. The solution treated in this way was spray dried. The powdered copolymer was then sealed in sacks of aluminum composite sheet, the filled sack being flushed with nitrogen twice before the sealing, and being stored under various conditions. In addition, samples were also sealed under air and then stored at 25° C. The peroxide content was determined directly after treatment and after storage for three and six months. The results are listed in Table 2.

Example 6a

In analogy to Example 6 but without addition of SO2 and ascorbic acid.

Example 7

A 20% aqueous solution of polyvinylpyrrolidone homopolymer having a K value of 12 (measured in a 5% by weight aqueous solution) was treated at 80° C. with 0.1% by weight of sulfur dioxide (based on polymer; employed in the form of a 6% solution of $SO_2$ in water), and the solution was stirred for one hour. The solution was then cooled to 40° C., and 0.1% by weight of ascorbic acid (based on polymer) was added. The solution treated in this way was spray dried. The powdered polyvinylpyrrolidone was then sealed in sacks of aluminum composite sheet, the filled sack being flushed with nitrogen twice before the sealing, and being stored under various conditions. In addition, samples were also sealed under air and then stored at 25° C. The peroxide content was determined directly after treatment and after storage for three and six months. The results are listed in Table 1 below.

Example 7a

In analogy to Example 7 but without addition of SO2 and ascorbic acid.

Example 8

A 20% aqueous solution of polyvinylpyrrolidone homopolymer having a K value of 90 (measured in a 1% by weight aqueous solution) was treated at 80° C. with 0.1% by weight of sulfur dioxide (based on polymer; employed in the form of a 6% solution of $SO_2$ in water), and the solution was stirred for one hour. The solution was then cooled to 40° C., and 0.1% by weight of ascorbic acid (based on polymer) was added. The solution treated in this way was dried on a drum dryer. The powdered polyvinylpyrrolidone was then sealed in sacks of aluminum composite sheet, the filled sack being flushed with nitrogen twice before the sealing, and being stored under various conditions. In addition, samples were also sealed under air and then stored at 25° C. The peroxide content was determined directly after treatment and after storage for three and six months. The results are listed in Table 1 below.

Example 8a

In analogy to Example 8 but without addition of SO2 and ascorbic acid.

Example 9

Crosslinked polyvinylpyrrolidone (PVPP; PVP popcorn polymer)

A 15% aqueous suspension of crosslinked polyvinylpyrrolidone was treated at 80° C. with 0.1% by weight of sulfur dioxide (based on solid polymer PVPP; in the form of a 6% strength solution in water), and the solution was stirred for one hour. The suspension was then filtered and washed. The PVPP was then mixed with 0.1% by weight of ascorbic acid (based on polymer), and the polymer was then dried. The PVPP powder was subsequently sealed in sacks of aluminum composite sheet, the filled sack being flushed with nitrogen twice before the sealing, and being stored under various conditions. In addition, samples were also sealed under air and then stored at 25° C. The peroxide content was determined directly after treatment and after storage for three and six months. The results are listed in Table 1 below.

Example 9a

In analogy to Example 9 but without addition of SO2 and ascorbic acid.

Example 10

Betacarotene Tablet 100.0 g of betacarotene 10% dry powder were mixed with 1000.0 g of calcium hydrogen phosphate and 1110.0 g of microcrystalline cellulose in a Turbula mixer. This mixture was then moistened in a Diosna granulator with 600.0 g of 25% strength aqueous polyvinylpyrrolidone of K value 30 solution using polyvinylpyrrolidone of Example 1, and the moist composition was passed through a 0.8 mm sieve. Drying took place on a tray at 30° C. The dry granules were then sieved once more through a 0.8 mm sieve and mixed with 15.0 g of magnesium stearate, 25.0 g of colloidal silica and 100.0 g of crosslinked polyvinylpyrrolidone prepared as in Example 9, and the mixture was compressed in a rotary tablet press under 10 kN to tablets having a diameter of 8 mm and a weight of 250 mg.

The tablets were stored in glass vessels at 30° C. for 6 months, and the betacarotene content was determined.

Initial value: 99.6% betacarotene 6-month value: 99.1% betacarotene

For comparison, the commercial products polyvinylpyrrolidone K 30 (peroxide content: 320 ppm) and crospovidone (peroxide content: 250 ppm) were employed in the same formula.

Initial value: 98.1% betacarotene 6-month value: 95.3% betacarotene

The results show a marked stabilization of the betacarotene both directly after preparation and on storage when polyvinylpyrrolidones of the invention are used.

Example 11

Levonorgestrel Tablet 7.5 g of levonorgestrel were dissolved in 500.0 g of 20% strength ethanolic polyvinylpyrrolidone of K value 30 solution using polyvinylpyrrolidone of Example 1, and this solution was used to moisten a mixture of 1100.0 g of calcium hydrogenphosphate and 1152.5 g of microcrystalline cellulose in a Diosna granulator, and the moist composition was passed through a 0.8 mm sieve. Drying took place on a tray at 35° C. The dry granules were then sieved again through a 0.8 mm sieve and mixed with 15.0 g of magnesium stearate, 25.0 g of colloidal silica and 100.0 g of crosslinked polyvinylpyrrolidone prepared as in Example 9, and the mixture was compressed in a rotary tablet press under 15 kN to tablets having a diameter of 8 mm and a weight of 250 mg.

The tablets were stored in glass vessels at 30° C. for 6 months, and the levonorgestrel content was determined.

Initial value: 99.5% levonorgestrel 6-month value: 99.2% levonorgestrel

For comparison, the commercial products polyvinylpyrrolidone K 30 (peroxide content: 320 ppm) and crospovidone (peroxide content: 250 ppm) were employed in the same formula.

Initial value: 98.5% levonorgestrel 6-month value: 96.3% levonorgestrel

The results show a marked stabilization of the levonorgestrel both directly after preparation and on storage on use of polyvinylpyrrolidones of the invention.

Example 12

Epinephrine Injection 1.2 g of epinephrine HCl, 10.0 g of polyvinylpyrrolidone K 12 prepared as in Example 7 and 7.5 g of sodium chloride were dissolved in 998.0 g of water for injections which had been boiled and cooled under nitrogen. The solution was sterilized by filtration through a 0.22 µm filter and dispensed under nitrogen into 1 ml ampoules.

The ampoules were stored at 25° C. for 3 months, and the epinephrine content was determined.

Initial value: 98.5% epinephrine 3-month value: 96.9% epinephrine

For comparison, the commercial product polyvinylpyrrolidone K 12 (peroxide content: 290 ppm) were employed in the same formula.

Initial value: 96.4% epinephrine 3-month value: 89.3% epinephrine

The results show a marked stabilization of epinephrine both directly after preparation and on storage on use of polyvinylpyrrolidone of the invention.

Example 13

Promethazine Solution 22.6 g of promethazine HCl, 25.0 g of polyvinylpyrrolidone K 90 prepared as in Example 8, 5.0 g of citric acid, 2.0 g of sorbic acid and 60.0 g of sucrose were dissolved in 975.0 g of demineralized water at 50° C., and the solution was cooled to room temperature and dispensed into 50 ml amber glass bottles.

The bottles were stored at 30° C. for 9 months, and the promethazine content was determined.

Initial value: 99.8% promethazine 9-month value: 99.5% promethazine

For comparison, the commercial product polyvinylpyrrolidone K 90 (peroxide content: 360 ppm) were employed in the same formula.

Initial value: 98.4% promethazine 9-month value: 95.3% promethazine

The results show a marked stabilization of promethazine both directly after preparation and on storage on use of polyvinylpyrrolidone of the invention.

Example 14

Film Strip with Terbutaline Sulfate 100.0 g of vinylpyrrolidone/vinyl acetate (6:4) copolymer prepared as in Example 6 and 100.0 g of vinyl alcohol/polyethylene glycol graft copolymer (Kollicoat IR, BASF AG) were dissolved by stirring in 800.0 g of demineralized water. 10.0 g of terbutaline sulfate and 2.0 g of saccharin sodium were then dissolved in this polymer solution. A film was produced in an Erichsen film former using a 500 µm knife.

The film was dried at 50° C. and then the film was cut into 20×20 mm pieces and packed in plastic containers.

The containers were stored at 30° C. for 6 months, and the terbutaline sulfate content was determined.

Initial value: 99.6% terbutaline sulfate 6-month value: 99.8% terbutaline sulfate For comparison, the commercial product polyvinylpyrrolidone K 90 (peroxide content: 360 ppm) were employed in the same formula.

Initial value: 98.0% terbutaline sulfate 6-month value: 94.6% terbutaline sulfate The results show a marked stabilization of promethazine both directly after preparation and on storage on use of polyvinylpyrrolidone of the invention.

Example 15

Prednisolone Tablet 100.0 g of prednisolone were mixed with 1100.0 g of lactose suitable for direct tableting and 80.0 g of polyvinylpyrrolidone K30 prepared as in Example 1, 60.0 g of crosslinked polyvinylpyrrolidone prepared as in Example 9 and 15.0 g of magnesium stearate were mixed in a Turbula mixer. This mixture was then compressed in a rotary tablet press under 8 kN to tablets having a diameter of 7 mm and a weight of 135.0 mg.

We claim:

1. A method for stabilizing polyvinylpyrrolidones, comprising treating polyvinylpyrrolidone with sulfur dioxide, sulfurous acid or an alkali metal sulfite and subsequently with ascorbic acid or a salt thereof.

2. The method according to claim 1, wherein sulfur dioxide, sulfurous acid or the alkali metal sulfite are employed in amounts of from 0.01 to 0.5% by weight based on the amounts of polyvinylpyrrolidone.

3. The method according to claim 1, wherein the ascorbid acid or the salt thereof is employed in amounts of from 0.01 to 1% by weight based on the amounts of polyvinylpyrrolidone.

4. The method according to claim 1, wherein the polyvinylpyrrolidone is treated with sulfur dioxide, sulfurous acid or an alkali metal sulfite and subsequently with ascorbic acid.

5. The method according to claim 1, wherein the treating takes place in a solution of the polymer.

6. The method according to claim 5, wherein the treating takes place in aqueous solution.

7. The method according to claim 1, wherein the treating takes place in aqueous suspension.

8. The method according to claim 1, wherein the treating with sulfur dioxide, sulfurous acid or the alkali metal sulfite takes place at temperatures of from 10 to 100° C.

9. The method according to claim 4, wherein the treating with ascorbic acid takes place at temperatures of from 0 to 100° C.

10. The method according to claim 1, wherein the polyvinylpyrrolidone is a homo- or a copolymer of N-vinylpyrrolidone having a vinylpyrrolidone content of at least 5% by weight.

11. The method according to claim 1, wherein the polyvinylpyrrolidone is converted into a powdered polyvinylpyrrolidone by drying.

12. The method according to claim 11, wherein the drying is carried out by spray or drum drying.

13. The method according to claim 1, wherein the ascorbic acid salt is selected from the group consisting of ammonium ascorbate, sodium ascorbate, and magnesium ascorbate.

14. The method as claimed in claim 1, wherein the polyvinylpyrrolidone is treated with the alkali metal sulfite and the alkali metal sulfite is selected from the group consisting of potassium sulfite, potassium bisulfite, lithium sulfite, lithium bisulfite, sodium sulfite and sodium bisulfite.

15. The method according to claim 2, wherein ascorbid acid or the salt thereof is employed in amounts of from 0.01 to 0.5% by weight based on the amounts of polyvinylpyrrolidone.

16. The method according to claim 2, wherein the treating takes place in a solution of the polymer.

17. The method according to claim 3, wherein the treating takes place in a solution of the polymer.

18. The method according to claim 4, wherein the treating takes place in a solution of the polymer.

19. The method according to claim 1, wherein sulfur dioxide, sulfurous acid or the alkali metal sulfite are employed in amounts of from 0.03 to 0.2% by weight based on the amounts of polyvinylpyrrolidone.

20. The method according to claim 1, wherein the ascorbid acid or the salt thereof is employed in amounts of from 0.05 to 0.25% by weight based on the amounts of polyvinylpyrrolidone.

21. The method according to claim 1, wherein the ascorbic acid salt is selected from the group consisting of ammonium, alkali metal, or earth alkali metal salt of ascorbic acid.

* * * * *